United States Patent Office 3,075,541
Patented Jan. 29, 1963

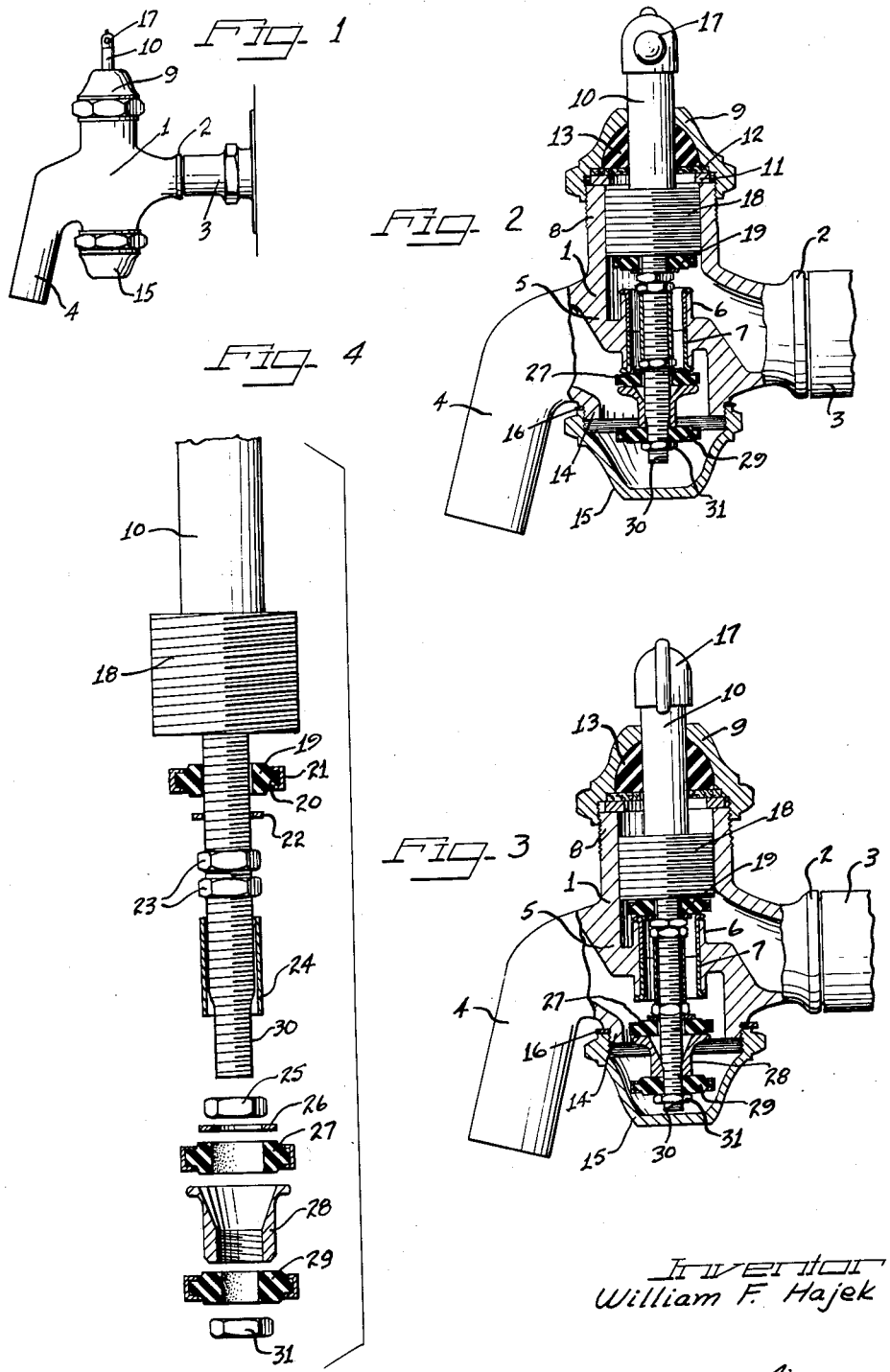

3,075,541
ALTERNATING SEATING FAUCET VALVE
William F. Hajek, 909 W. 20th Place, Chicago 8, Ill.
Filed Dec. 9, 1959, Ser. No. 858,431
5 Claims. (Cl. 137—329.01)

This invention relates to improvements in faucets, spigots, cocks, and similar items, and more particularly to a faucet of the type commonly used in homes as well as other buildings for sinks, washbowls, bathtubs, etc., although the invention may be used for industrial purposes and has many other various uses and purposes as will be apparent to one skilled in the art.

While numerous types of faucets and the like have been developed in the past, one of the main objections to such structures resides in the fact that the valve element or disc therein cannot be removed and replaced with a new one without shutting off the water or other liquid supply normally controlled by the faucet. While in modern and more expensive homes, for example, the plumbing includes a valve in each of the hot and cold water lines in the immediate vicinity of a faucet for shutting off the water supply in the event the faucet needs repairs, there are numerous older and more economical installations, wherein one or a very few supply line control valves are incorporated, and these are frequently in the basement or some relatively remote location that is difficult to find in case of an emergency. In many such older installations, the users have not been advised or long forgotten where the main shutoff valve may be, and irksome delay in repairing a faucet is occasioned by such circumstance. Even though the location of the main valve may be known, it is frequently at an objectionably remote location, and in many cases the entire water supply to the particular house or apartment must be cut off in order to repair one single faucet. Other objections to formerly known faucets and the like resided in the fact that the faucet was of such construction that the valve elements or discs could be ground against the seats in the manipulation of the faucet handle and become grooved or otherwise injured requiring excessive pressure in an endeavor to effect a complete shutting off of the water, or became prone to stick rendering it objectionably difficult to turn the faucet handle, and in either event the life of the element or disc was materially shortened. It might also be mentioned that formely known faucets and the like, in each instance of which I am aware, were single acting, in that a partial rotation of the handle in one direction resulted in opening the valve while a reverse rotation resulted in closing it, and if the valve element or disc became injured, leakage would result until that particular element or disc was replaced with a new one.

With the foregoing in mind, it is an important object of the instant invention to provide a faucet or the like so constructed that a worn valve element or disc may be removed and replaced without any need of shutting off the water or other liquid supply to the faucet.

Another object of the instant invention is the provision of a faucet or the like so constructed that not only may a valve element or disc be removed and replaced without the necessity of cutting the water or other fluid supply to the faucet off, but there is no need to remove the cap member of the faucet or withdraw the valve stem in order to effect removal and replacement of a worn valve element or disc.

It is also an object of this invention to provide a faucet or the like having a dual acting valve mechanism therein embodying a pair of valve elements or discs, the faucet being so constructed that the fluid supply may be shut off by one of the valve elements or discs, while the other may be removed and replaced.

Still a further object of the instant invention is the provision of a faucet or the like having an opening in the bottom thereof closed by a hollow cap nut, which provides access to a valve element or disc controlling flow of fluid through the faucet, whereby upon the simple removal of that nut the valve element or disc may be removed and replaced without the need of withdrawing the valve stem, there being other means associated with the faucet to cut off the flow of fluid during the repair work.

Still a further feature of the instant invention resides in the provision of a faucet or the like that is dual acting, having a pair of valve elements therein so arranged that a partial turn of the faucet handle permits the flow of fluid therethrough and either a reverse partial turn or a continuation in the same direction results in shutting off the flow of fluid, whereby one of the valve elements may be utilized to control the flow of fluid while the other valve element may be removed and replaced with a new one.

It is also an object of this invention to provide a faucet containing valve mechanism so arranged that a valve element or disc cannot stick to its seat, but will be forced therefrom upon a slight and easy turn of the faucet handle.

Still a further desideratum of the invention is the provision of a faucet or the like containing a valve element of improved construction, greatly enhancing the life of the element.

It is also a feature of the invention to provide a faucet or the like containing a valve element floatingly mounted and so arranged that it cannot be forcibly rotated against its seat and thus injured by a manipulation of the valve stem operating means.

While some of the more salient features, characteristics and advantages of the instant invention have been above pointed out, others will become apparent from the following disclosures, taken in conjunction with the accompanying drawing, in which FIGURE 1 is a fragmentary side elevational view of a faucet embodying principles of the instant invention, showing the same mounted in operative position;

FIGURE 2 is a fragmentary vertical sectional view through the structure of FIGURE 1, with parts shown in elevation;

FIGURE 3 is a view similar in character to FIGURE 2, but showing the valve mechanism in a different position of operation; and FIGURE 4 is an enlarged fragmentary, part sectional, part elevational view illustrating the elements carried by the valve stem separated one from the other.

As shown on the drawings:

It is to be understood that the instant valve mechanism may be incorporated in a faucet, spigot, stopcock, or similar devices of substantially any type or form. The faucet may have a single discharge opening or a single fixed spout, or the mechanism may be employed at either end of a mixing chamber from which a single spout discharges both hot and cold water, as is common in connection with kitchen sinks. Also, the valve stem may be actuated by rotation of a handle, may be spring returned, or actuated by a spring urged pushbutton, the particular mode of causing the valve stem to move not being an essential part of the instant invention. For illustrative purposes only, and not by way of limitation, the invention has been illustrated in the drawings and will be herein described in connection with a simple form of fixed spout faucet of the type that might commonly be used on a lavatory.

The illustrated embodiment of the invention includes a casing or bowl 1 having an inlet opening defined by an externally threaded nipple 2 for connection with the usual flange coupling 3 which is in turn connected to a fluid supply line or water pipe in a well known manner. On the opposite side thereof the casing 1 is provided with a fixed discharge spout 4. Internally, the casing 1 is constructed similarly to the casing of a globe valve including an inside partition 5 having a central opening therethrough defined by a cylindrical portion 6 which may be provided with a suitable lining 7 turned over each end of the cylindrical portion to provide a valve seat at each end of the cylindrical portion 6. When the valve mechanism to be later described herein is in open position, liquid or other fluid may flow from the supply line through the nipple 2, the cylindrical portion 6 of the partition 5, and exit through the spout 4.

The casing 1 is also provided with a top opening defined by an externally and internally threaded nipple 8 normally closed by a cap nut 9 engaged with the external threads of the nipple 8 and having an aperture therein through which the upper part of a valve stem 10 projects. Inside the cap nut 9 is a washer 11, a suitable sealing gasket 12, and a stuffing 13 which may be in the form of a lubricating and sealing graphite element.

The casing 1 is also provided with an opening in the bottom thereof defined by an externally threaded nipple-like projection 14 normally closed by a cap nut 15, there being a suitable gasket 16 between these parts for sealing purposes. The cap nut 15 is preferably cup-shaped in character and may be given an external contour in keeping with the desired appearance of the entire faucet.

The actual valve mechanism as assembled on the stem 10 is shown in the exploded view of FIG. 4 with the parts separated from each other for purposes of clarity. The stem is actuated by a suitable dial or handle 17 on the top thereof, as seen in the other figures of the drawings. For threaded engagement with the nipple 8 of the casing, the stem is provided with an enlarged multiple threaded portion 18 which causes an up and down movement of the stem or a reciprocatory movement thereof whenever the handle 17 is turned one way or the other.

Beneath the enlarged portion 18 is a valve disc 19 made of any suitable resilient material, such as rubber, synthetic rubber or equivalent substance. This disc is provided with a central aperture sufficiently large in diameter for the disc to float or ride freely up and down the stem. The valve disc 19 is preferably made to be extremely durable and long lasting. To this end, the disc itself is provided with an outer annular portion 20 of less width than the body part of the disc, and this portion is protected by a metallic ring 21, preferably U shape in cross-section, as seen clearly in FIGURE 4. At this point it should be noted that all of the other valve discs to be mentioned herein are preferably constructed the same way.

Beneath the valve disc 19 is a loosely floating washer 22 that prevents the valve disc from rubbing against the upper of a pair of lock nuts 23 engaged upon the lower threaded portion of the valve stem 10 to maintain the valve disc 19 at the proper height. Beneath these nuts is a spacer sleeve 24 and engaged upon the stem 10 below that spacer sleeve is a nut 25, a loosely floating washer 26, a floating valve disc 27, and a holding nut 28 which threads upon the shaft to keep the valve disc 27 at the right height. Underneath the holding nut 28 is a third valve disc 29 which must be screwed onto the stem 10, and beneath the disc 29 engaging a portion 30 of the stem of reduced diameter is a nut 31 to maintain the valve 29 tightly in position. This valve 29 prevents leakage along the threads on the valve stem inside the holding nut 28.

In operation, the instant invention is extremely simple and effective. During normal operation the valve disc 27 is mainly relied upon, and when the valve is in closed position this disc is engaged against the lower valve seat on the cylindrical portion 6 of the casing partition 5 as shown in FIG. 2. It is quite satisfactory to have the threads on the portion 18 of the valve stem cut so that a quarter turn of the valve stem opens the faucet to the full extent by moving the stem downwardly until the valve disc 27 leaves its seat, with the valve disc 19 spaced an equal distance above the upper valve seat. A reverse quarter turn brings the seat 27 back into the closed position of FIG. 2.

However, should the valve disc 27 become worn and somewhat ineffective, the valve stem may be rotated the 90° to open position, and then another 90° to close the valve by way of the disc 19 abutting the upper valve seat. No fluid can then flow through the valve, and it is a simple expedient for an operator to remove the cap nut 15 at the bottom of the casing, take off the nut 31, the valve disc 29, and use a pair of pliers or a wrench on the flat sides of the holding nut 28. The valve disc 27 will then drop off, and may readily be replaced with a new one, and the nut 28, disc 29 and nut 31 again threaded onto the lower end of the valve stem. The closing of the cap nut 15 completes the operation, and it has been accomplished in a minimum length of time, and without the necessity of shutting off the water or other fluid at any point except in the faucet itself.

At the same time, it will be especially noted that the valve discs by virtue of their construction are positive in action and extremely long lived. Further, it is impossible for either valve disc to stick in position and render it difficult to turn the valve stem handle, because a slight turn of the handle causes the washer 22 to force the upper disc off its seat while the washer 26 will force the lower disc 27 off its seat. It might also be noted that if an added packing gland or washer of rubber, fabric or other suitable material is placed between the disc 29 and the nut 28, the disc 29 might be made like the discs 19 and 27 and utilized as a substitute for the disc 27 when the latter becomes worn and ineffective. Additionally, it might also be noted that it is impossible for a user of the faucet to make a mistake and turn the faucet while it is open to a splash producing position, because a continued turn of the handle in the same direction results in closing the passage through the valve casing by means of the other valve disc.

It will be understood that modifications and variations may be effected without departing from the scope of the novel concepts of the present invention.

I claim as my invention:

1. In a faucet, a casing having an inlet and outlet for a fluid, a partition in said casing between said inlet and outlet having a passage therethrough, a valve seat at each end of said passage, a valve stem extending through said passage, a valve element on said stem for each said seat either of which may be utilized to close said passage, at least one of said valve elements freely floating on said stem to afford a gradual increase in flow from the faucet to avoid splashing from pent-up pressure, retaining means on said stem to limit the movement of the valve elements relatively to said stem, means to reciprocate said stem and selectively hold either valve element on its respective seat, said casing having an opening therein through which the retaining means for one of said valve elements may be removed to replace the element while the other valve element blocks flow through said passage, and a cover for said opening.

2. In a faucet, a casing having an inlet and outlet for a fluid, a partition in said casing between said inlet and outlet having a passage therethrough, a valve seat at each end of said passage, a valve stem extending through said passage, a valve element on said stem for each of said seats either of which valve elements may be utilized to close said passage, means to reciprocate said valve stem and selectively hold either valve on its seat, said casing having an opening therein through which access may be had to one of said valve elements while the other of said valve elements blocks said passage, and a removable cover over said opening affording access to said one of said valve elements, said valve elements being removably mounted for ready replacement.

3. In a faucet, a casing having an inlet and an outlet for fluid, a partition in said casing between said inlet and said outlet having a passage therethrough, a valve seat at each end of said passage, a valve stem extending through said passage, a valve element on said stem for each of said valve seats, either of which valve elements may be utilized to close said passage, means for reciprocating said valve stem in said passage, said casing having an opening therein through which access may be had to one of said valve elements while the other of said valve elements blocks said passage, a removable cover over said opening affording access to said one valve element, abutting means carried by said stem on the inner side of each of said valve elements to force the element off its respective seat in the event of sticking, said valve elements being mounted removably and in floating relation to said valve stem and said abutting means being adjustable on said valve stem to vary the action of said faucet.

4. In a faucet, a casing having an inlet and an outlet for a fluid, a partition in said casing between the inlet and outlet having a passage therethrough, a valve seat at each end of said passage, a valve stem extending through said passage, a valve element on said stem for each said seat either of which elements may be utilized to close said passage, means to reciprocate said valve stem to selectively seat and hold either valve element on its respective seat, removable mounting means to hold each valve element on said stem, said casing having an opening therein communicating with said outlet through which access may be had for removal of one valve element while the other is held on its seat to block flow through said passage, a removable cover over said opening, and a spare valve element carried by said stem and accessible through said opening while one of the other valve elements is held on its seat to block flow through said passage.

5. In a faucet, a casing having an inlet and an outlet for a fluid, a partition in said casing between the inlet and outlet having a passage therethrough, a valve seat at each end of said passage, a valve stem extending through said passage, a valve element on said stem for each said seat either of which elements may be utilized to close said passage, means to reciprocate said valve stem to selectively seat and hold either valve element on its respective seat, removable mounting means to hold each valve element on said stem, said casing having an opening therein communicating with said outlet through which access may be had for removal of one valve element while the other is held on its seat to block flow through said passage, and a removable cover over said opening.

References Cited in the file of this patent

UNITED STATES PATENTS

| | | |
|---|---|---|
| 628,691 | Calahan | July 11, 1899 |
| 641,601 | Miller | Jan. 16, 1900 |
| 668,881 | O'Meara | Feb. 26, 1901 |
| 999,409 | Snow | Aug. 1, 1911 |
| 1,055,673 | Smedberg | Mar. 11, 1913 |
| 1,170,050 | Daniels | Feb. 1, 1916 |
| 1,240,848 | Hiscock | Sept. 25, 1917 |
| 1,242,864 | Ricks | Oct. 9, 1917 |

FOREIGN PATENTS

| | | |
|---|---|---|
| 282,898 | Germany | 1915 |